(12) United States Patent
Tchoukaleysky (10) Patent No.: US 8,559,791 B2
(45) Date of Patent: Oct. 15, 2013

(54) DIGITAL CINEMA ANTI-PIRACY METHOD AND APPARATUS FOR LIQUID CRYSTAL PROJECTION SYSTEMS

(75) Inventor: Emil Tchoukaleysky, Toronto (CA)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/696,317

(22) PCT Filed: May 6, 2010

(86) PCT No.: PCT/IB2010/001050
§ 371 (c)(1),
(2), (4) Date: Nov. 6, 2012

(87) PCT Pub. No.: WO2011/138627
PCT Pub. Date: Nov. 10, 2011

(65) Prior Publication Data
US 2013/0051769 A1  Feb. 28, 2013

(51) Int. Cl.
*H04N 9/80* (2006.01)

(52) U.S. Cl.
USPC .................................. 386/258; 386/E5.003

(58) Field of Classification Search
USPC ......................................... 386/258, E05.003
See application file for complete search history.

(56) References Cited

U.S. PATENT DOCUMENTS

| 6,559,883 B1* | 5/2003 | Fancher et al. ............... 348/164 |
| 7,006,630 B2* | 2/2006 | Yu et al. ......................... 380/201 |
| 2006/0029252 A1 | 2/2006 | So |

FOREIGN PATENT DOCUMENTS

| WO | WO2007023482 | 3/2007 |
| WO | WO2008107731 | 9/2008 |

* cited by examiner

*Primary Examiner* — Hung Dang
*Assistant Examiner* — Nien-Ru Yang
(74) *Attorney, Agent, or Firm* — Robert D. Shedd; Jeffrey M. Navon; Catherine A. Cooper (57) ABSTRACT

Described herein are a method and apparatus including receiving digital video content, receiving an indication of an object of an image of the digital video content, receiving an indication of a grouping of the object in a frame sequence per second, swapping forward in time the grouping of the object with a time-following object to generate a first non-sequential frame of digital video content, performing an object assignment for the forward time swap, swapping backward in time the grouping of the object with a time-following object to generate a second non-sequential frame of digital video content and performing an object assignment for the backward time swap. The swapping backward in time and the swapping forward in time cause flicker in a recording of the digital video content.

10 Claims, 6 Drawing Sheets

Initial onject position in the TV frame, with Object 1 group of lines

Fig. 1 Initial onject position in the TV frame, with Object 1 group of lines

Fig.2 Delayed object reproduction in next TV frame

Fig. 3 Consecutive swap of Object 1 in time with selected neighboring objects

Fig 4. Creating image gap in the illegal recording

Fig. 5

Fig. 6 Block diagram of the apparatus

DIGITAL CINEMA ANTI-PIRACY METHOD AND APPARATUS FOR LIQUID CRYSTAL PROJECTION SYSTEMS

This application claims the benefit, under 35 U.S.C. §365 of International Application PCT/IB2010/001050, filed May 6, 2010, which was published in accordance with PCT Article 21(2) on Nov. 10, 2011 in English.

FIELD OF THE INVENTION

The present invention relates to digital cinema and, in particular, to a method and apparatus related to anti-piracy for liquid crystal projection systems.

BACKGROUND OF THE INVENTION

The unwanted and illegal video recording (camcording) in theatres projecting digital cinema content adversely affects the authorship rights of movie creators, and also the business of production studios and theatre chains. Different methods exist to protect against (combat) illegal recording (camcording), but some of them are intrusive for the audience, others (such as laser-based methods) are dangerous for the movie viewers, or have doubtful efficiency.

A number of attempts to technically prevent the video recording (camcording) in movie theatres have been described. So far there is no recognized technology that satisfies this need. Also, with the advent of Digital Cinema (DC), techniques of watermarking were created. Watermarking detection recognizes in which theatre the recording (camcording) occurred but will not be able to obstruct illegal video image capturing. That is, with the aid of watermarking detection techniques and a copy of the pirated content, it is possible to determine when and where the pirated copy was recorded (captured). The accused pirate must still be captured and then it becomes a legal matter as to conviction and punishment. In the alternative or additionally, the content distributor may approach the operator of the theatre at which the alleged pirated copy was recorded and demand increased security. It would be far easier and more efficient to discourage piracy by rendering the pirated copy unpleasant or irritating to view (watch) during rendering (displaying) of the content. The difficulties come from the fact that the viewing in the theatre may be affected by the protecting tools—the picture could be degraded, or the audience could be exposed to unwanted light flashing and beaming, e.g., if lasers were used.

There are four categories of anti-piracy methods, to which the method of the present invention could be compared:

1) Methods for locating and blinding an illegal used camera. These methods are using a scanning light beam, transmitted from the main screen area towards the audience, and reflected back from shiny objects. Reflection from camera parts and lenses is received and analyzed for detection of the illegally used camera location. Once the intrusive camera is detected, a light beam is directed to its lens, obstructing the capture of the movie (video, digital image content). The advantage of this category of methods is rendering the illegally recorded image useless. One disadvantage of the approach is non-conclusiveness in locating the camera in the audience—any shiny object (e.g. earrings) could reflect the light beam. Also, there is a danger the beam may scan and locate eye glasses (shiny objects) and direct the light beam toward the eye glasses.

2) Methods for projecting invisible light from the screen to the whole audience, which would disturb the acquisition functions of any illegal camera. This approach relies on the extended optical sensitivity of the illegal used camera in ultra-violet and in infra-red directions (ranges), and the Human Visual system perception of moving light. The advantage of this category of methods is the safety for the viewers. The disadvantage is the possibility of defeating the approach by installing optical color filter in front of the camera lens to block the thrown light.

3) Methods for adding extra frames to the projected digital image sequence, which would become visible in the illegal recorded video content. The advantage of this category is that there is no need to install equipment in the digital cinema theatre for anti-piracy protection. The disadvantage is the possibility for some viewers to perceive the additional video frames, which are not related to the subject of the movie.

4) Methods for interposing interfering sources between the projector and the projection screen, which would create temporal beat frequencies. The advantage is that the illegally used camera (camcorder) may capture the beat frequencies and its picture will be degraded. The disadvantage is that the audience will also perceive the disturbances.

It would be advantageous to have a safe and efficient method for anti-piracy, which creates enough disturbances on the digital cinema but does not decrease the quality of digital cinema viewing.

SUMMARY OF THE INVENTION

The digital cinema anti-piracy method and apparatus for liquid crystal projector systems increases the level of protection against movie piracy in cinema theatres equipped with liquid crystal on silicon (LCOS) digital projectors. If somebody is illegally using a video camera to shoot (record, camcord) a movie (digital image content) being rendered (displayed) on a theatre screen, using the present invention, this video camera will record the digital image content with an invisible artifact, which will become visible when the recorded pictures are reproduced later on a video display. As used herein a video display used for playback of illegally recorded or camcorded digital image content may be a TV or computer monitor or home projection system or any other equivalent unit upon which digital image content can be rendered (displayed).

The present invention extends the research done earlier and filed as PCT Patent Application Number PCT/IB2007/000553. This earlier patent application concerned inducing flicker in Digital Light Processing (DLP) projection systems in order to combat piracy of digital image content. The present invention focuses on Liquid Crystal Displays (LCD) that employ different technology than DLP displays.

The present invention applies non-sequential generation of the image in a frame buffer of a reproduction stage apparatus at a post-production facility thus building an image protection of the digital cinema image content. The non-sequential generated image is then distributed to theatres for use with LCD/LCOS digital projectors (projection systems). Instead of the normal line-by-line and pixel-by-pixel video (digital image content) generation to create the picture, the method of the present invention generates the video display frame lines and pixels in a sequence, defined by an anti-piracy method of the present invention. The latter aims to create a time-gap where the illegally used video camera (camcorder) periodically captures a video frame with missing elements, while the Human Visual System (HVS) integrates the gap during the theatre presentation.

The method and apparatus of the present invention create a content-related flicker in the reproduced camcorded (recorded) movie (video, digital image content), making it unpleasant and irritating to watch (view). For best results, the selection of the frame object used to create the flicker in one scene is done by a human operator during the movie mastering.

The present invention improves the abilities for technical protection against illegal camcording (recording) in digital cinema theatres by applying non-intrusive image processing technology. The method of the present invention is adapted to LCOS type of projectors, which are becoming popular in digital cinema theatres, and targets particularly the Silicon X-tal Reflective Display (SXRD). The present invention could be part of a system that covers multiple types of projectors, including LCD and LCOS. The approach described herein is safe and non-intrusive. It introduces flicker in the reproduced illegal image.

Described herein are a method and apparatus including receiving digital video content, receiving an indication of an object of an image of the digital video content, receiving an indication of a grouping of the object in a frame sequence per second, swapping forward in time the grouping of the object with a time-following object to generate a first non-sequential frame of digital video content, performing an object assignment for the forward time swap, swapping backward in time the grouping of the object with a time-following object to generate a second non-sequential frame of digital video content and performing an object assignment for the backward time swap. The swapping backward in time and the swapping forward in time cause flicker in a recording of the digital video content.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Recently, significant progress has been made in the domain of digital projection technology, which is starting to replace the classic film projection. A goal of the present invention is use some of the features of the digital LCD and LCOS projector systems not available in the traditional film projection system, and to develop a new tool (weapon, barrier) against illegal camcording.

One feature of digital projectors based on LCOS devices, is their image grid, where every pixel can be addressed individually. The voltage charge, applied to a display cell, does not follow the classic sequential process called raster. Digital Cinema employs 12 bits of quantized digital video for each RGB color, and every image element in a LCOS system is processed via a digital-to-analog converter for display (rendering) on the theatre screen. The possibility for random access to all frame pixels is used here to deliver the anti-piracy method of the present invention. The reproduced digital image conforms to the motion picture imaging standards and satisfies the picture perception in Human Visual System (HVS).

LCOS projection systems are capable of displaying (rendering) digital images at different frame rates or number of projected Frames Per Second (FPS). The process allows for smooth change from one speed to another, e.g. from 24 FPS (classic film rate) to 30 FPS (video rate), to 60 FPS, or even higher. Using this option to confuse the illegal camcording has been discussed by others, but the Digital Cinema Initiative specifications call for a constant frame rate.

The approach described herein is to change the intra-frame projection time position of selected scene objects. The method of the present invention gradually shifts the time (moment) of appearance of these selected objects from frame to frame. This process thus creates a frame gap in the illegal recording.

Choosing appropriate scene objects is conducted at for example, a post-production stage with the objective of creating a flicker that will provide maximum protection.

The digital cinema Anti-Piracy method for LCD and LCOS projectors is harmless to the theatre audience, does not affect audience picture perception, and provides indicative artifacts on the illegally recorded image.

The display value for a LCD pixel could be entered as both sequences, namely the line-by-line and the pixel-by-pixel sequences that access it, or in a random manner in one video frame. This way an object can be selected and its pixels reproduced in a sequence, otherwise they would be spread over several video image lines. The brightness of the reproduced object remains unchanged.

The method of the present invention gradually changes (over a time interval, for example 1.0 seconds), during LCD projection, the intra-frame time position of selected scene objects in the forward direction for 0.5 second of a 1.0 second time interval, and gradually returns in the backward direction for the other 0.5 second of the 1.0 second time interval. The process is then repeated with the selected scene objects. Since the LCD principle of light emission is radically different from the light modulation in DLP projectors, the object time shift is achieved in a random access manner.

Figure 1:
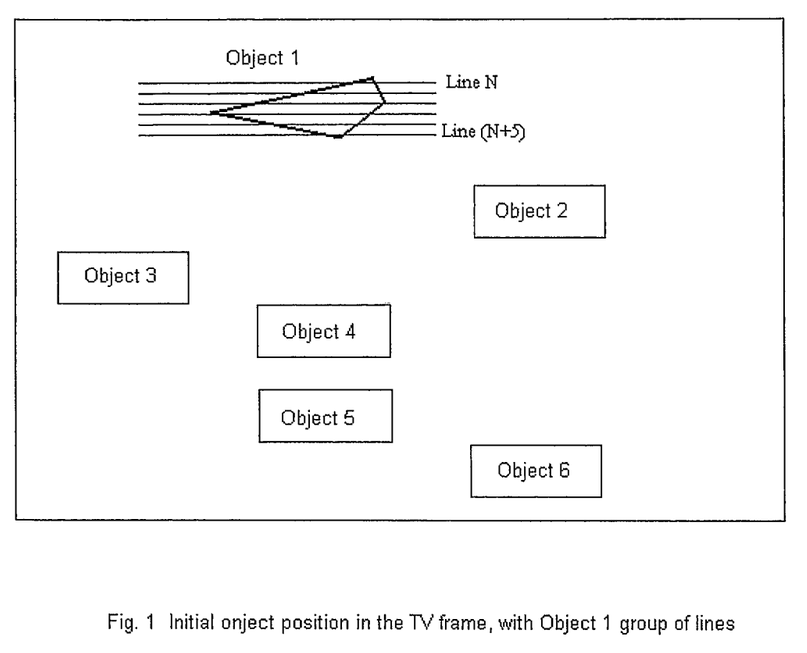
FIG. 1 shows the initial position of objects in a video frame and also shows object 1 as a group (series) of lines.

The image in FIG. 1 includes one example-object, denoted Object 1, together with an indication of the video image lines that shape its display—line N through line (N+5). While the horizontal and vertical positions of this object are related to the movie content and cannot be touched, the moment (instant, time) of its reproduction within the video frame is a variable of the present invention. The time of reproduction for Object 1 is swapped with the time of reproduction for one of the later objects in the same frame—Object 2; next frame—swapped with Object 3, next frame—Object 4, then Object 5, and then Object 6. Thus Object 1 appears gradually delayed in the video frame sequence by an amount which the HVS cannot perceive. No geometric position of any object is affected. The method of the present invention groups objects with the same number of video frame lines, which means that these objects require an equal amount of reproduction time.

Figure 2:
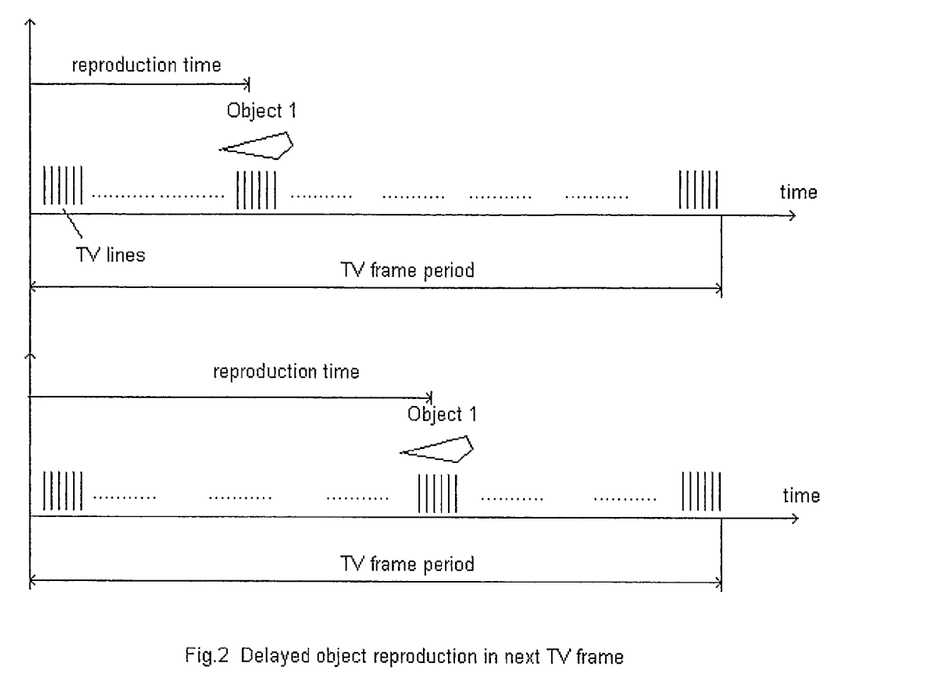
FIG. 2 shows the delayed object presentation in a next video frame.

FIG. 2 shows a time-diagram of the process for delayed Object 1 reproduction. During the next video frame-period this object is displayed to the right on the time axis, and has to be switched with another object along the temporal direction.

Practically, the object moves in time once every several video frames, for five times in a 0.5 second time interval.

Figure 3:
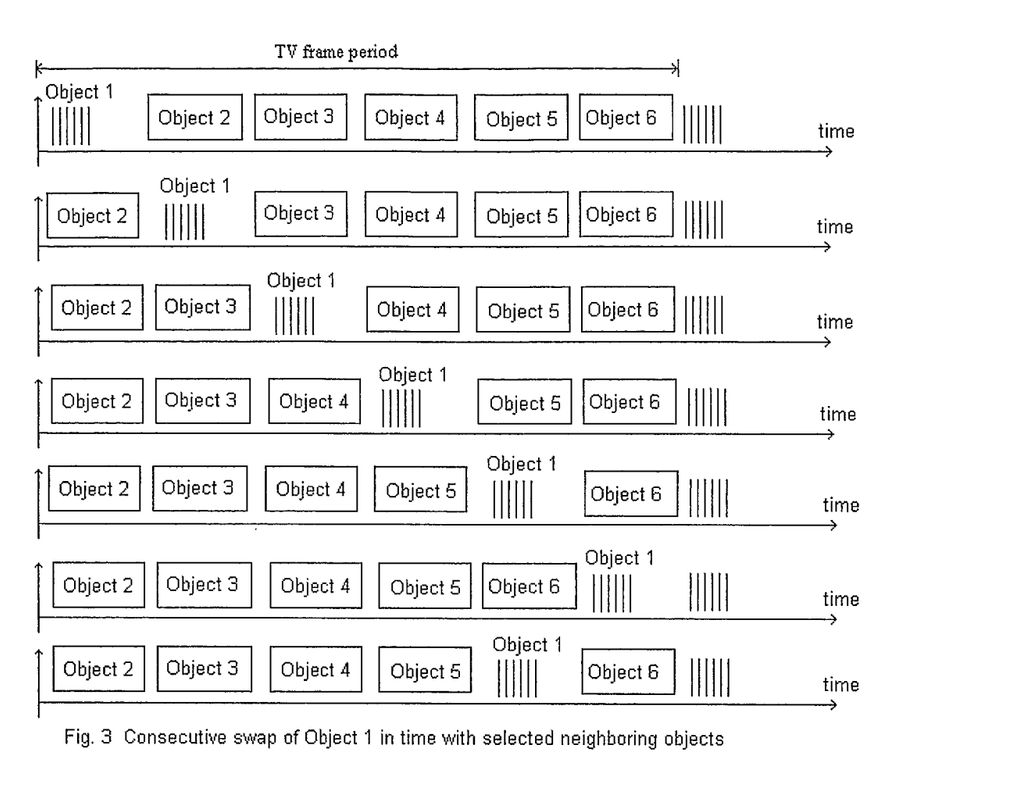
FIG. 3 shows the consecutive swap of object 1 in time with selected neighboring objects.

The details of the method of the present invention are depicted in FIG. 3. Object 1 is described by its video lines, while Object 2 through Object 6 are presented by rectangular modules along the time axis. Every next object in the figure shows the playback relations in the next video frame period. Object 1 gets reproduced in the time moment of its following object, while the replaced object is displayed in the Object 1 original moment (time).

Figure 4:
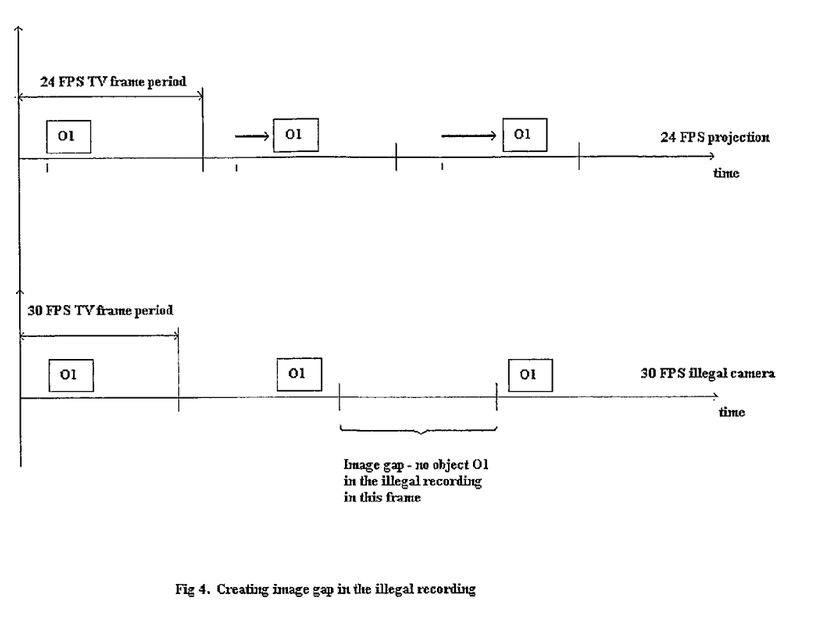
FIG. 4 shows the creation of an image gap in an illegal recording (camcording).

The present invention accelerates the phase difference until at some point in time the camcorded (recorded) frame misses one scene object, as shown in FIG. 4. The missing frame situation repeats every second, creating flicker in the illegally recorded (camcorded) image.

The given example and figures are for object grouping by their video lines. The method of the present invention, though, includes also grouping by pixels, as well as by pixels and video lines combined. The three versions are based on the same principle: modifying the object reproduction moment, as selected and tested at the post-production phase of the movie.

The fundamentals of the present invention are connected to image-related flicker. When reproduced, the illegal recording (camcording) has some objects appear to change their brightness from one frame to the next frame. The object's moment (instant, time) of appearance in the frame is modified to create a time gap, where the missing object in the illegal camcording (recording) has actually zero brightness. This time processing is similar to Pulse Position Modulation (PPM). There is a threshold of visibility for flicker in the HVS. The flicker of the present invention is below the threshold of visibility in DC theatres, due to the direct viewing of PPM image objects over more than one frame. A illegally recorded (camcorded) video, on the other hand, first converts the PPM image objects to video level in one frame via its optical sensors, and then the viewer of its image will notice the flicker, based on the level difference between neighboring frames.

It could be assumed that the operator of the camera (camcorder) that illegally recorded (camcorded) the video content will know about the flicker-creating method and may try to reduce its effect by keeping the camera shutter open. The efficiency of the present invention, though, is not affected by any camera function, since a camera would capture the gap because it uses its own frame-based sequence, while HVS integrates the PPM pictures.

The present invention is for human operator involvement in selecting which scene objects to flicker. Thus, the method and apparatus of the present invention occur and are located at a post-production facility. The object position on the screen could also be selected for best protection. Thus, the flicker could be moved to a zone where it is more efficient and/or noticeable.

Figure 5:
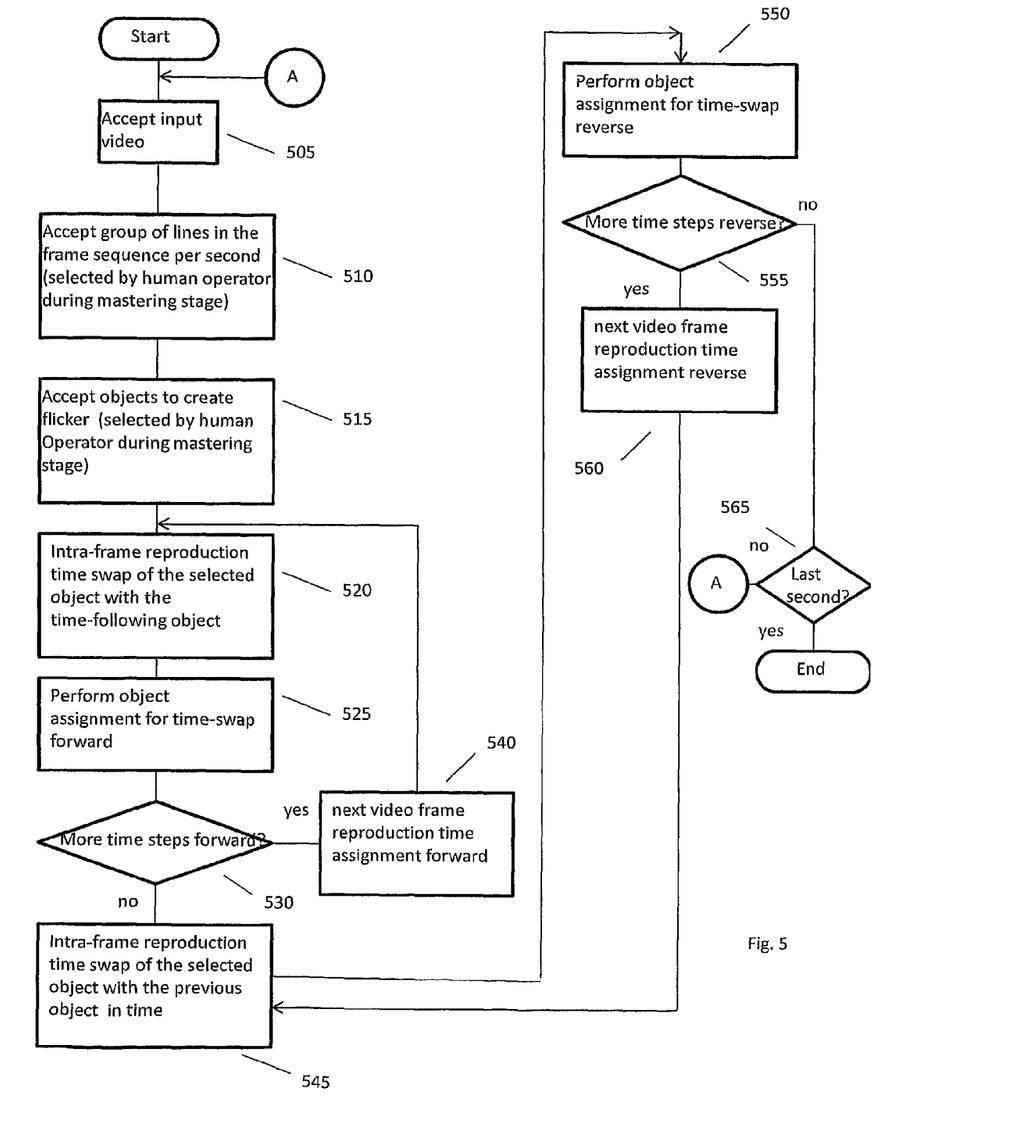
FIG. 5 is a flowchart of an exemplary embodiment of the method of the present invention to create an image gap in illegally recorded (camcorded) video content.

FIG. 5 is a flowchart of an exemplary embodiment of the present invention depicts the functional block-diagram of the algorithm. The input video is accepted and the method permits a human operator (at the mastering stage) to select groups of lines in the video frame sequence, which defines the vertical size of the objects for creating flicker. The intra-frame reproduction/playback time for the swapped object is selected and then the operator assigns an object for time-swap forward. The first test-block will check how many time-swaps, or time steps, are implemented per second forward and will make a loop in the method until the assigned objects are returned to their original positions at the end of one second. The method continues until the last assigned time step is completed. At 505 video (digital content) input ius received and accepted. At 510 the group of lines in the frame sequence per second that were selected during the mastering stage by a human operator are received and accepted. At 515 the objects that are to be used to create the flicker (selected during the mastering stage by a human operator) are received and accepted. At 520 the intra-frame reproduction time swap of the selected object with the time following object is performed (accomplished). At 525 the object assignment for the time-swap in the forward direction is performed (determined). At 530 a test is performed to determine if there are more time steps in the forward direction. If there are more time steps in the forward direction then at 540 the next video frame reproduction time assignment in the forward direction is made (performed). If there are no more time steps in the forward direction then at 545 the intra-frame reproduction time swap of the selected object with the previous object in time is performed (accomplished). At 550 the object assignment for the time-swap in the reverse direction is performed (determined). At 555 a test is performed to determine if there are more time steps in the reverse direction. If there are more time steps in the reverse direction then at 560 the next video frame reproduction time assignment in the reverse direction is made (performed). If there are no more time steps in the reverse direction then at 565 a test is performed to determine if this is the last second of the video. If this is the last second of the video then processing ends. If this is not the last second of the video then processing proceeds to 505.

Figure 6:
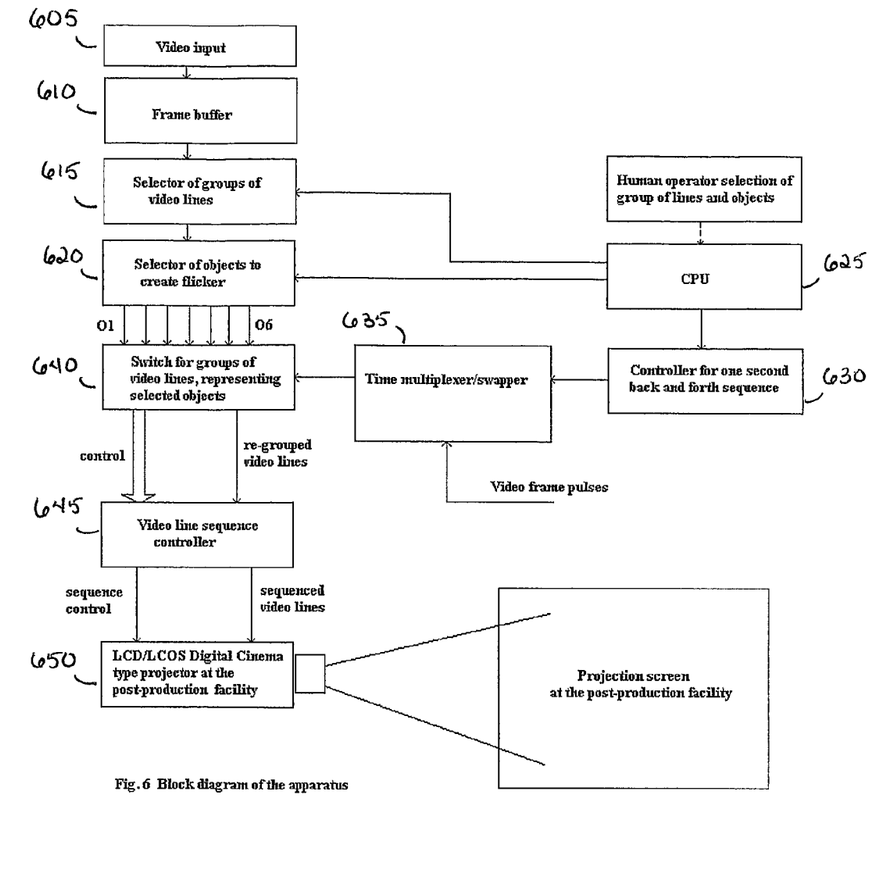
FIG. 6 is a block diagram of an exemplary embodiment of the present invention to create an image gap in illegally recorded (camcorded) video content.

FIG. 6 is a block-diagram of the apparatus of an exemplary embodiment of the present invention. FIG. 6 is at the reproduction stage (phase). The input video is received and accepted by a video input module 605 and connected to a video frame buffer 610, which plays the role of a video time store. The time-delayed output of the frame buffer 610 is supplied to a selector for group of video lines 615. The latter 615 is connected to a selector of objects to create flicker 620, where the time steps or the time swaps of the method are generated for switching the video lines of the objects in time (objects O1 through O6 in the example). A human operator selects the group of video (frame) lines and the object that will flicker at the mastering stage (phase). The human operator input is accepted by the Central Processing Unit (CPU) 625. The selectors 615 and 620 are controlled by the CPU 625. The sequence for forward and reverse object swapping is shaped (determined) in a controller 630, also connected to the CPU 625. The output of the controller 630 produces a signal for the time multiplexer 635 (swapper) to define 0.5 second forward, and then 0.5 second reverse time intervals. The multiplexer output is connected to the control port of a switch 640. The object assignment starts with the human operator selection unit (module, component), and through the CPU 625 it becomes a machine code, which is converted to a computer processing task in the controller 630, and then the multiplexer 635 converts the above assignment to the video world. The multiplexer 635 also accepts video frame pulses as input. The purpose of the video frame pulses is to provide video synchronization. The outputs of the switch 640 create two sets of signals: the re-grouped in time video lines as video content, and the control for the video line pulses. These two sets are applied to a sequence controller 645, which shapes (determines) the needed data and the commands for a given model of LCD/LCOS Digital Cinema projector 650. The projector delivers the movie picture light on the projection screen 655. Depending on its model, the projector might need to be modified, if it does not have a line sequence access port. The LCD/LCOS projectors shown on FIG. 6 are for testing purposes only. The processed digital video content is distributed to theaters in a variety of ways such as electronically or by means of digital media.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
receiving digital video content;
receiving an indication of an object of an image of said digital video content;
receiving an indication of a grouping of said object in a frame sequence, wherein said grouping of said object is one of lines or pixels or a combination of lines and pixels, and wherein said grouping of said object defines a horizontal and vertical position of said object within said image;
intra-frame swapping said grouping of said object with a grouping of a neighboring object, wherein said neighboring object is defined by a grouping of an object, and wherein said intra-frame swapping occurs in a forward direction with respect to time;
performing an object assignment for said forward time swap;
intra-frame swapping said grouping of said object with a grouping of a neighboring object, wherein said neighboring object is a grouping of an object, and wherein said intra-frame swapping occurs in a backward direction with respect to time; and
performing an object assignment for said backward time swap, wherein said forward time swap of objects occurs for half of a pre-determined time interval and said backward time swap occurs for half of said pre-determined time interval.

2. The method according to claim 1, further comprising storing each non-sequential generated frame of digital video content.

3. The method according to claim 1, wherein said forward time swap occurs for 0.5 seconds of a 1.0 second interval and said backward time swap occurs for 0.5 seconds of said 1.0 second interval and said forward time swapping and said backward time swapping continue for the duration of the digital video content.

4. The method according to claim 1, wherein said received digital video content is sequential.

5. The method according to claim 1, wherein said backward swapping in time and said forward swapping in time cause flicker in a recording of said digital video content.

6. An apparatus comprising:
means for receiving digital video content;
means for receiving an indication of an object of an image of said digital video content;
means for receiving an indication of a grouping of said object in a frame sequence, wherein said grouping of said object is one of lines or pixels or a combination of lines and pixels, and wherein said grouping of said object defines a horizontal and vertical position of said object within said image;
means for intra-frame swapping said grouping of said object with a grouping of a neighboring object, wherein said neighboring object is a grouping of an object that follows said grouping of objects in time, and wherein said intra-frame swapping occurs in a forward direction with respect to time;
means for performing an object assignment for said forward time swap;
means for intra-frame swapping said grousing of said object with a grouping of a neighboring object, wherein said neighboring object is a grouping of an object that precedes said grouping of object in time, and wherein said intra-frame swapping occurs a backward direction with respect to time; and
means for performing an object assignment for said backward time swap, wherein said forward time swap of objects occurs for half of a pre-determined time interval and said backward time swap occurs for half of said pre-determined time interval.

7. The apparatus according to claim 6, further comprising means for storing each non-sequential generated frame of digital video content.

8. The apparatus according to claim 6, wherein said forward time swap occurs for 0.5 seconds of a 1.0 second interval and said backward time swap occurs for 0.5 seconds of said 1.0 second interval and said forward time swapping and said backward time swapping continue for the duration of the digital video content.

9. The apparatus according to claim 6, wherein said received digital video content is sequential.

10. The apparatus according to claim 6, wherein said means for backward swapping in time and said means for forward swapping in time cause flicker in a recording of said digital video content.

* * * * *